US 9,478,179 B2

(12) United States Patent
Roth et al.

(10) Patent No.: US 9,478,179 B2
(45) Date of Patent: Oct. 25, 2016

(54) MULTI-COLOR LIQUID CRYSTAL DISPLAY

(71) Applicants: Samsung Display Co., Ltd., Yongin-si (KR); Dalia Roth, Petach Tikva (IL)

(72) Inventors: Shmuel Roth, Petach Tikva (IL); Moshe Ben-Chorin, Rehovot (IL); Doron Malka, Tel-Aviv (IL); Dan Eliav, Zichron Yaakov (IL)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/593,507

(22) Filed: Jan. 9, 2015

(65) Prior Publication Data

US 2015/0116390 A1 Apr. 30, 2015

Related U.S. Application Data

(63) Continuation of application No. 13/902,438, filed on May 24, 2013, now Pat. No. 8,934,072, which is a continuation of application No. 12/909,742, filed on Oct. 21, 2010, now Pat. No. 8,451,405, which is a continuation of application No. 12/359,483, filed on Jan. 26, 2009, now Pat. No. 8,179,502, which is a continuation of application No. 11/882,452, filed on Aug. 1, 2007, now Pat. No. 7,495,722, which is a continuation-in-part of application No. 11/009,515, filed on Dec. 13, 2004, now Pat. No. 7,483,095.

(60) Provisional application No. 60/529,101, filed on Dec. 15, 2003, provisional application No. 60/604,461, filed on Aug. 26, 2004.

(51) Int. Cl.
*G02F 1/1335* (2006.01)
*G09G 3/36* (2006.01)
*G02F 1/1362* (2006.01)
*G09G 3/20* (2006.01)

(52) U.S. Cl.
CPC ....... *G09G 3/3607* (2013.01); *G02F 1/136286* (2013.01); *G09G 3/3611* (2013.01); *G02F 2201/52* (2013.01); *G09G 3/2003* (2013.01); *G09G 2300/0452* (2013.01); *G09G 2300/0465* (2013.01); *G09G 2340/0407* (2013.01); *G09G 2340/0457* (2013.01)

(58) Field of Classification Search
CPC ............... G09G 2300/0452; G09G 3/3607; G09G 3/2003
USPC ........................................ 349/108; 345/694
See application file for complete search history.

(56) References Cited

U.S. PATENT DOCUMENTS

| | | | |
|---|---|---|---|
| 2002/0191130 A1* | 12/2002 | Liang | G02F 1/133514 349/108 |
| 2003/0052597 A1 | 3/2003 | Sakurai | |
| 2003/0127657 A1 | 7/2003 | Park | |
| 2004/0174389 A1* | 9/2004 | Ben-David | G09G 3/3413 345/694 |
| 2004/0234163 A1* | 11/2004 | Lee | G06T 3/4092 382/298 |

FOREIGN PATENT DOCUMENTS

| | | |
|---|---|---|
| CN | 1387074 | 12/2002 |
| EP | 1 032 045 | 8/2000 |
| EP | 1 094 436 | 4/2001 |
| JP | 61-069091 | 4/1986 |
| JP | 03-198027 | 8/1991 |
| JP | 09-204156 | 8/1997 |
| JP | 2001-296523 | 10/2001 |
| JP | 2002-182191 | 6/2002 |
| WO | WO 02/101644 | 12/2002 |

OTHER PUBLICATIONS

Office Action issued by the State Intellectual Property Office of the People's Republic of China for Application No. 201310052221.9 dated Dec. 10, 2015.

* cited by examiner

*Primary Examiner* — Thanh-Nhan P Nguyen
(74) *Attorney, Agent, or Firm* — Pearl Cohen Zedek Latzer Baratz LLP

(57) ABSTRACT

A display and methods of driving the display, where the display includes a plurality of pixels, where some colors are present in every pixel, and some colors are only present in less than all of the pixels.

24 Claims, 11 Drawing Sheets

| R | G | R | G | R | G | R | G |
|---|---|---|---|---|---|---|---|
| B | Y | B | C | B | Y | B | C |

FIG. 8A

| G | B | G | B | G | B | G | B |
|---|---|---|---|---|---|---|---|
| R | Y | R | C | R | Y | R | C |

FIG. 8B

| R | G | B | C | R | G | B | C |
|---|---|---|---|---|---|---|---|
| B | Y | R | G | B | Y | R | G |

FIG. 8C

| R | G | B | Y | C | R | G | B | R | G | B | Y |
|---|---|---|---|---|---|---|---|---|---|---|---|
| B | R | G | B | Y | C | R | G | B | R | G | B |
| G | B | R | G | B | Y | C | R | G | B | R | G |
| R | G | B | R | G | B | Y | C | R | G | B | R |

FIG. 9A

| R | G | B | Y | C | R | G | B | R | G | B | Y |
|---|---|---|---|---|---|---|---|---|---|---|---|
| G | B | R | G | B | Y | C | R | G | B | R | G |
| C | R | G | B | R | G | B | Y | C | R | G | B |
| B | Y | C | R | G | B | R | G | B | Y | C | R |

FIG. 9B

| R | G | B | Y | C | R | G | B | R | G | B | Y |
|---|---|---|---|---|---|---|---|---|---|---|---|
| R | G | B | R | G | B | Y | C | R | G | B | R |
| B | Y | C | R | G | B | R | G | B | Y | C | R |
| B | R | G | B | Y | C | R | G | B | R | G | B |

FIG. 9C

| R | G | R | G | R | G | R | G | R | G | R | G |
|---|---|---|---|---|---|---|---|---|---|---|---|
| B | Y | B | C | B | Y | B | C | B | Y | B | C |
| G | R | G | R | G | R | G | R | G | R | G | R |
| C | B | Y | B | C | B | Y | B | C | B | Y | B |

FIG. 10A

| R | G | R | G | R | G | R | G | R | G | R | G |
|---|---|---|---|---|---|---|---|---|---|---|---|
| B | Y | B | C | B | Y | B | C | B | Y | B | C |
| R | G | R | G | R | G | R | G | R | G | R | G |
| B | C | B | Y | B | C | B | Y | B | C | B | Y |

FIG. 10B

| R | G | B | C | R | G | B | C | R | G | B | C |
|---|---|---|---|---|---|---|---|---|---|---|---|
| B | Y | R | G | B | Y | R | G | B | Y | R | G |
| R | G | B | C | R | G | B | C | R | G | B | C |
| B | Y | R | G | B | Y | R | G | B | Y | R | G |

FIG. 11A

| R | G | B | C | R | G | B | C | R | G | B | C |
|---|---|---|---|---|---|---|---|---|---|---|---|
| B | Y | R | G | B | Y | R | G | B | Y | R | G |
| G | B | C | R | G | B | C | R | G | B | C | R |
| Y | R | G | B | Y | R | G | B | Y | R | G | B |

MULTI-COLOR LIQUID CRYSTAL DISPLAY

CROSS-REFERENCE TO RELATED APPLICATIONS

This application is a continuation of U.S. patent application Ser. No. 13/902,438, filed May 24, 2013 and entitled Multi-Color Liquid Crystal Display, which is a continuation of U.S. patent application Ser. No. 12/909,742, filed Oct. 21, 2010, now U.S. Pat. No. 8,451,405 and entitled Multi-Color Liquid Crystal Display, which is a continuation of U.S. patent application Ser. No. 12/359,483, filed Jan. 26, 2009, now U.S. Pat. No. 8,179,502 and entitled Multi-Color Liquid Crystal Display, which is a continuation of U.S. patent application Ser. No. 11/882,452, filed Aug. 1, 2007, now U.S. Pat. No. 7,495,722 and entitled Multi-Color Liquid Crystal Display, which is a continuation in part of U.S. patent application Ser. No. 11/009,515, filed Dec. 13, 2004, now U.S. Pat. No. 7,483,095 and entitled Multi-Primary Liquid Crystal Display, which claims the benefit of U.S. Provisional Patent Application No. 60/529,101, filed Dec. 15, 2003 and the benefit of U.S. Provisional Patent Application No. 60/604,461, filed Aug. 26, 2004, the disclosures of all of which are incorporated herein by reference in their entirety.

FIELD OF THE INVENTION

The invention relates generally to multi-primary color displays and, more particularly, to multi-primary Liquid Crystal Displays (LCDs).

BACKGROUND

A Liquid Crystal Display device includes an array of Liquid Crystal (LC) elements, which may be driven, for example, by one or more Thin Film Transistor (TFT) elements. In some LCD devices, the LC array may include a plurality of column line drivers and a plurality of row line drivers to allow controlling each element of the LC array.

The TFTs, the row line drivers and the column line drivers may block part of the light provided to the LC array, and consequently reduce the level of brightness of the display. Thus, it may be desired to reduce the amount of light blocked by the TFTs, the row line drivers and the column line drivers. Furthermore, it may be desired to reduce the number of the TFTs, the row line drivers and/or the column line drivers in order to reduce the cost of the display.

SUMMARY OF EMBODIMENTS OF THE INVENTION

Embodiments of the invention include a method, device and/or system for displaying a color image having a plurality of more-than-three primary color pixels.

BRIEF DESCRIPTION OF THE DRAWINGS

The invention will be understood and appreciated more fully from the following detailed description of embodiments of the invention, taken in conjunction with the accompanying drawings of which:

FIGS. 8A, 8B, and 8C are schematic illustrations of portions of five-color display embodiments of the present invention having three colors repeating and two colors alternating, where the pixels are each arranged on two horizontal rows;

FIGS. 9A, 9B, and 9C are schematic illustrations of portions of five-color display embodiments of the present invention having three colors repeating and two colors alternating, where the pixels are each arranged on a single horizontal row;

FIGS. 10A and 10B are schematic illustrations of portions of five-color display embodiments of the present invention having three colors repeating and two colors alternating, where the pixels are each arranged on two horizontal rows; and FIGS. 11A and 11B are schematic illustrations of portions of five-color display embodiments of the present invention having three colors repeating and two colors alternating, where the pixels are each arranged on two horizontal rows.

Figure 1:
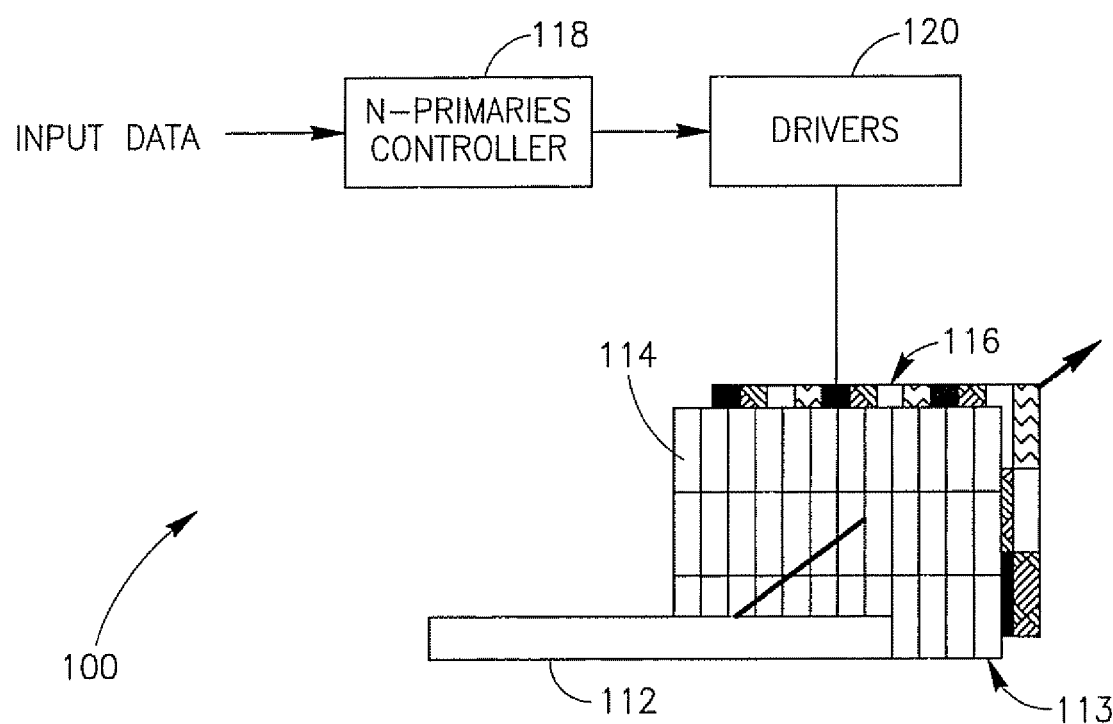
FIG. 1 is a schematic illustration of a more-than-three primary color display system in accordance with exemplary embodiments of the invention.

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

Embodiments of monitors and display devices with more than three primaries, in accordance with exemplary embodiments of the invention, are described in International Application PCT/IL02/00452, filed Jun. 11, 2002, entitled "DEVICE, SYSTEM AND METHOD FOR COLOR DISPLAY" and published 19 Dec. 2002 as PCT Publication WO 02/101644, the disclosure of which is incorporated herein by reference.

Reference is made to FIG. 1, which schematically illustrates a more-than-three primary color display system 100 in accordance with exemplary embodiments of the invention.

According to exemplary embodiments of the invention, system 100 may include a light source 112, and an array of sub-pixel elements. For example, system 100 may include an array 113 of liquid crystal (LC) elements (cells) 114, for example, an LC array using Thin Film Transistor (TFT) active-matrix technology, as is known in the art; and an n-primary-color filter array 116, wherein n is greater than three, which may be, for example, juxtaposed to array 113. System 100 may include any other suitable configuration of sub-pixel elements. System 100 may further include electronic circuits 120 ("drivers") for driving the cells of array 113, e.g., by active-matrix addressing, as is known in the art, According to some exemplary embodiments of the invention, a pixel of a color image may be reproduced by sub-pixel elements of more than three primary colors, wherein each sub-pixel element corresponds to one of the n primary colors. Back-illumination source 112 provides the light needed to produce the color images. The transmittance of each of the sub-pixel elements may be controlled, for example, by the voltage applied to a corresponding LC cell of array 113, based on image data input for one or more corresponding pixels, as described below. An n-primaries controller 118 may be able to receive the image data including sub-pixel data representing pixels of the color image, and to selectively activate at least some of the sub-pixel elements of array 113 to produce an attenuation pattern based on the sub-pixel data. For example, controller 118 may receive the input data, e.g., in Red (R), Green (G), and Blue (B) or YCbCr format, optionally scale the data to a desired size and resolution, and adjust the magnitude of the signal delivered to the different drivers based on the input data. Controller 118 may be able to convert input image data, e.g., data including RGB image components or YCbCr data of a pixel, into sub-pixel data of more than three primary colors, e.g., R, G, B, Yellow (Y), and Cyan (C). The intensity of white light provided by back-illumination source 112 may be spatially modulated by elements of the LC array, selectively controlling the illumination of each sub-pixel element according to the image data for one or more pixels, as described below. The selectively attenuated light of each sub-pixel passes through a corresponding color filter of color filter array 116, thereby producing desired color sub-pixel combinations. The human vision system spatially integrates the light filtered through the different color sub-pixel elements to perceive a color image.

An aperture ratio of a LCD display may be defined as the ratio between the net area of the display and the overall area of the display, wherein the net area of the display is defined as the overall area of the display excluding a total area of blocking, e.g., a total of areas of the display "blocked" by TFTs and the column and row driver lines, as is known in the art. For example, the total area of blocking of a display including 1 rows of m sub-pixel elements, wherein each sub-pixel element includes one TFT, wherein each row includes one row driver line, and wherein each column includes one column driver, may be calculated as follows:

$$m*L_{column}*t_{column}+l*L_{row}*t_{row}+l*m*S_{tft} \qquad (1)$$

wherein $S_{tft}$ denotes the blocking area of each TFT, $L_{row}$ and $t_{row}$ denote the length and width of each row driver line, respectively, and $L_{column}$ and $t_{column}$ denote the length and width of each column driver line, respectively. Accordingly, the overall area of the display may be approximately $L_{column}*L_{row}$, and the aperture ratio of the display may be calculated assuming an aspect ratio $AR=L_{row}/L_{column}$.

It will be appreciated by those skilled in the art that a higher total area of blocking may correspond to a lower brightness level of the display, since a larger amount of the light provided to the display is blocked by the TFTs and/or driver lines.

According to some exemplary embodiments of the invention, system 100 may be implemented for reproducing a color image having a plurality of more-than-three primary color pixels, using an array of sub-pixel elements of at least four different primary colors, wherein the total number, denoted $S_T$, of sub-pixel elements in the array is significantly smaller than a product P=s*n, wherein s denotes the number of more-than-three-primary color pixels in the image, and wherein n denotes the number of the at least four different primary colors, as described in detail below. For example, the number of sub-pixel elements in the array as a fraction of the product P may be related to the number of the four or more primary colors. The array may include, for example, sub-pixel elements arranged in at least one repeatable color sequence of sub-pixel elements of at least three primary colors, and the total number of sub-pixel elements in the array as a fraction of the product P may be equal to approximately the number of sub-pixel elements in the color sequence divided by the number of the four or more primary colors, as described below.

The human vision system may perceive different primary colors in different levels of spatial resolution. For example, the human vision may perceive some primary colors, e.g., blue and cyan, in a substantially lower level of spatial resolution in comparison to the perceived spatial resolution level of other primary colors, e.g., green, yellow and red. Thus, according to embodiments of the invention, some of the primary colors, e.g., blue and/or cyan, may be displayed in a lower spatial resolution, e.g., using a smaller number of sub-pixel elements, as compared to other primary colors, e.g., red, green and/or yellow, without significantly affecting the over-all resolution of the color image perceived by the human vision system, as described below.

According to exemplary embodiments of the invention, the sub-pixel elements of array 113 may be arranged in a predetermined configuration including a predetermined repeatable pattern including a predetermined, fixed, number of sub-pixel elements, each corresponding to one of the n primary colors. For example, array 113 may include sub-pixel elements of at least four different primary colors arranged in at least first and second repeatable color sequences of sub-pixel elements of at least three primary colors, wherein the first color sequence includes at least one sub-pixel element of a primary color not included in the second sequence, as described below. Accordingly, the pattern may include a smaller number of sub-pixel elements corresponding to one or more predetermined primary colors compared to the number of sub-pixel elements corresponding to other primary colors. According to some of these exemplary embodiments, drivers 120 of some of the sub-pixel elements, e.g., the drivers of sub-pixel elements corresponding to the one or more predetermined primary colors, may be provided with a value corresponding to a combination of sub-pixel data of more than one pixel, as described below. This manipulation of image data may be performed, for example, by controller 118.

Figure 2:
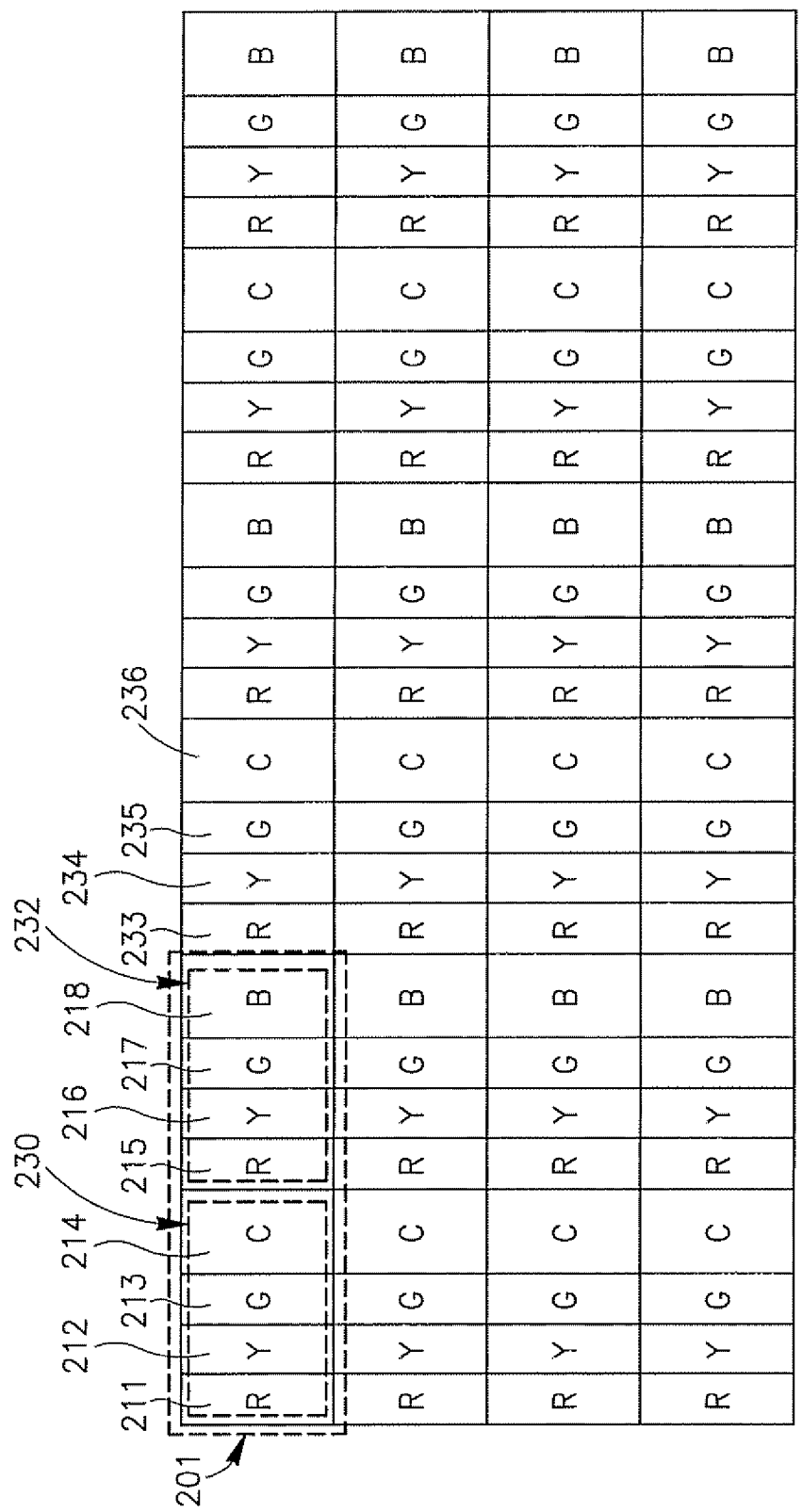
FIG. 2 is a schematic illustration of a sub-pixel configuration including a repeatable pattern of sub-pixel elements, in accordance with one exemplary embodiment of the invention.

Reference is made to FIG. 2, which schematically illustrates a configuration 200 of sub-pixel elements in a five-primary display device including a repeatable pattern 201, in accordance with one exemplary embodiment of the invention.

Pattern 201 may include sub-pixel elements corresponding to five primary colors, e.g., red, yellow, green, cyan and blue, arranged in a row including eight sub-pixel elements.

According to an exemplary embodiment, pattern 201 may include a smaller number of sub-pixel elements corresponding to each of the blue and cyan primary colors in comparison to the number of sub-pixel elements corresponding to each of the red, green and yellow primary colors, as described below.

Pattern 201 may include two sub-pixel elements, e.g., sub-pixel elements 211 and 215, corresponding to the red primary color, two sub-pixel elements, e.g., sub-pixel elements 212 and 216, corresponding to the yellow primary color, two sub-pixel elements, e.g., sub-pixel elements 213 and 217, corresponding to the green primary color, one sub-pixel element, e.g., sub-pixel element 214 corresponding to the cyan primary color, and one sub-pixel element, e.g., sub-pixel element 218, corresponding to the blue primary color.

According to this exemplary embodiment, configuration 200 may include sub-pixel elements arranged in at least first and second repeatable color sequences, e.g., color sequences 230 and 232. Sequence 230 may include at least one sub-pixel element, e.g., element 214, of a primary color, e.g., cyan, not included in sequence 232. Sequence 232 may include at least one sub-pixel element, e.g., element 218, of a primary color, e.g., blue, not included in sequence 230.

According to this exemplary embodiment, sequences 230 and 232 may each include sub-pixel elements of a predetermined sub-sequence of some of the primary colors, for example, a red-yellow-green sub-sequence. According to other embodiments of the invention one or more of the repeatable color sequences may include any other predetermined sub-color sequence.

According to some exemplary embodiments of the invention, each pixel of the color image may be reproduced by one or more sub-pixel elements of configuration 200. For example, a first pixel of the color image may be reproduced by sub-pixel elements 214, 215, 216, 217, and/or 218; and a second pixel, e.g., adjacent to the first pixel, may be reproduced by sub-pixel elements 218, 233, 234, 235 and/or 236. According to some embodiments of the invention, one or more sub-pixel elements of configuration 200, for example, sub-pixel elements corresponding to the blue and/or cyan primary colors, e.g., sub-pixel elements 218 and/or 214, may be activated based on a value determined by a combination of sub-pixel data corresponding to two or more pixels of the color image. Other sub-pixel elements of configuration 200, for example, sub-pixel elements corresponding to the green, red and/or yellow primary colors, e.g., sub-pixel elements 211, 212, 213, 215, 216, 217, 233, 234 and/or 235, may be activated based on sub-pixel data corresponding to one or more pixels. For example, one or more drivers, e.g. of drivers 120 (FIG. 1), of a sub-pixel element corresponding to one or more of the red, green or yellow primary colors, respectively, may be provided with a value corresponding to red, green and yellow sub-pixel data, respectively, of one or more pixels. This data arrangement may be provided by controller 118 (FIG. 1). A driver, e.g. of drivers 120 (FIG. 1), of a sub-pixel element corresponding to a primary color not included in one of sequences 230 and 232 may be provided with a value determined by a combination of sub-pixel data of two or more pixels. For example, a driver of a sub-pixel element corresponding to the cyan primary color may be provided with a value determined by a combination, e.g., an arithmetic average, a weighted average and/or any other suitable combination, of cyan sub-pixel data of two or more pixels. A driver, e.g. of drivers 120 (FIG. 1), of a sub-pixel element corresponding to a blue sub-pixel may be provided, for example, with a value determined by a combination, e.g., an arithmetic average, a weighted average and/or any other suitable combination, of blue sub-pixel data of two or more pixels. The two or more pixels may include, for example, two or more neighboring pixels, e.g., two or more vertically, horizontally and/or diagonally adjacent pixels, or any other two or more pixels of the color image. Thus, it will be appreciated by those skilled in the art that since the sub-pixel elements of pattern 201 may be activated to reproduce two pixels, the size of an effective pixel corresponding to configuration 200 ("the effective pixel size") may be equal to half the sum of the areas of the sub-pixel elements of pattern 201. Controller 118 (FIG. 1) may rearrange the sub-pixel data to provide the desired sequences of values to drivers 120.

According to exemplary embodiments of the invention, the size of some of the sub-pixel elements may be different than the size of other sub-pixel elements in order to achieve a desired white balance of the display. For example, the area covered by each sub-pixel element corresponding to the blue and/or the cyan primaries may be larger than the area covered by each sub-pixel element corresponding to the red, yellow and/or green primaries.

It will be appreciated by those skilled in the art that a display system, e.g., system 100 (FIG. 1), implementing configuration 200 for reproducing a color image including l rows of s 5-primary pixels, may include 4*s column driver lines and l row driver lines. Such a display may also include 4*s*l TFTs, e.g., one TFT located on each sub-pixel element. Accordingly, a total blocking area of such a display may be equal to:

$$4*S*L_{column}*t_{column}+l*L_{row}*t_{row}+4*l*s*S_{tft} \qquad (2)$$

It will be appreciated by those skilled in the art that a display according to the exemplary embodiments described above, may include a smaller number of column driver lines and a smaller number of TFTs compared to the number of column driver lines, e.g., 5*s, and the number of TFTs, e.g., 5*s*l, of other 5-primary display systems, e.g., wherein sub-pixel elements of five primary colors are used for reproducing each pixel. Consequently, a display according to the exemplary embodiments described above, may also have a relatively smaller total blocking area resulting in a higher brightness level, compared to the total blocking area, e.g., $5*S*L_{column}*t_{column}+l*L_{row}*t_{row}+5*l*s*S_{tft}$, and the resulting brightness level of other 5-primary display systems. For example, a 1280×720 display having a 16:9 aspect ratio, i.e., s=1280, l=720 and $L_{row}=16/9*L_{column}$, may have an aperture ratio of approximately 70%, i.e., a total area of blocking of approximately 30%, if sub-pixel elements of five primary colors are used for reproducing each pixel. Assuming the total area of blocking includes 6% TFT blocking, and 24% driver lines blocking, and assuming $t_{row}=t_{column}$, it will be appreciated by those skilled in the art that implementing sub-pixel arrangement 200 may reduce the TFT blocking to approximately 5%, and the driver line blocking to approximately 20%. Accordingly, the aperture ratio of such a display implementing arrangement 200 may be increased by approximately 5%, e.g. to an approximate value of 75%. Furthermore, implementing sub-pixel arrangement 200 may reduce the number of column drivers by approximately 20%, which may result in a reduction in a data rate required for activating the sub-pixel elements of pattern 200.

It will be appreciated by those skilled in the art that according to other embodiments of the invention, any other suitable pattern of sub-pixel elements, e.g., including any suitable two or more repeatable color sequences, may be implemented by display system 100 (FIG. 1) to form a sub-pixel configuration similar to configuration 200, e.g., as described below.

Figure 3:
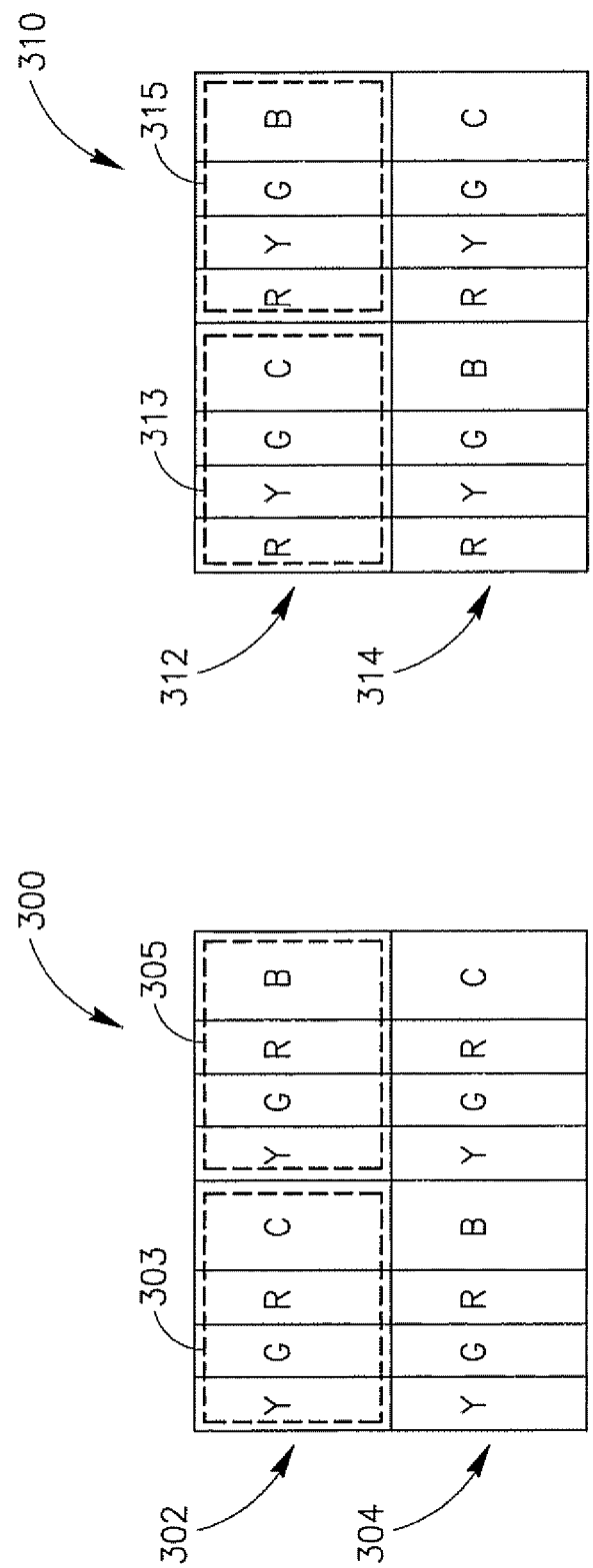
FIGS. 3A and 3B are schematic illustrations of a first 5-primary pattern of sub-pixel elements and a second 5-primary pattern of sub-pixel elements, respectively, which may be implemented to form sub-pixel configurations in accordance with other exemplary embodiments of the invention.

Reference is also made to FIGS. 3A and 3B which schematically illustrate a first 5-primary pattern 300 of sub-pixel elements and a second 5-primary pattern 310 of sub-pixel elements, respectively, which may be implemented to form configuration 200 according to other exemplary embodiments of the invention.

Pattern 300 may include two different rows, e.g., row 302 and row 304. Row 302 may include sub-pixel elements arranged, for example, in the order "yellow-green-red-cyan-yellow-green-red-blue". Row 304 may include sub-pixel elements arranged, for example, in the order "yellow-green-red-blue-yellow-green-red-cyan". Accordingly, pattern 300 may include a first color sequence 303, e.g., including sub-pixels elements of the primary colors "yellow-green-red-cyan", and a second color sequence 305, e.g., including sub-pixels elements of the primary colors "yellow-green-red-blue".

Pattern 310 may include two different rows, e.g., row 312 and row 314. Row 312 may include sub-pixel elements arranged, for example, in the order "red-yellow-green-cyan-red-yellow-green-blue". Row 314 may include sub-pixel elements arranged, for example, in the order "red-yellow-green-blue-red-yellow-green-cyan". Accordingly, pattern 310 may include a first color sequence 313, e.g., including sub-pixels elements of the primary colors "red-yellow-green-cyan", and a second color sequence 315, e.g., including sub-pixels elements of the primary colors "red-yellow-green-blue". According to other embodiments of the invention pattern 300 and/or pattern 310 may include any other suitable configuration of sub-pixel elements.

It will be appreciated by those skilled in the art that a pattern, e.g., pattern 300 or pattern 310, wherein the location of the cyan and blue primary colors is interchanged along the columns, may be implemented to achieve a more uniform color distribution across the display.

According to some embodiments of the invention, an effective pixel of the color image may be reproduced by sub-pixel elements of more than one row, as described below.

Figure 4:
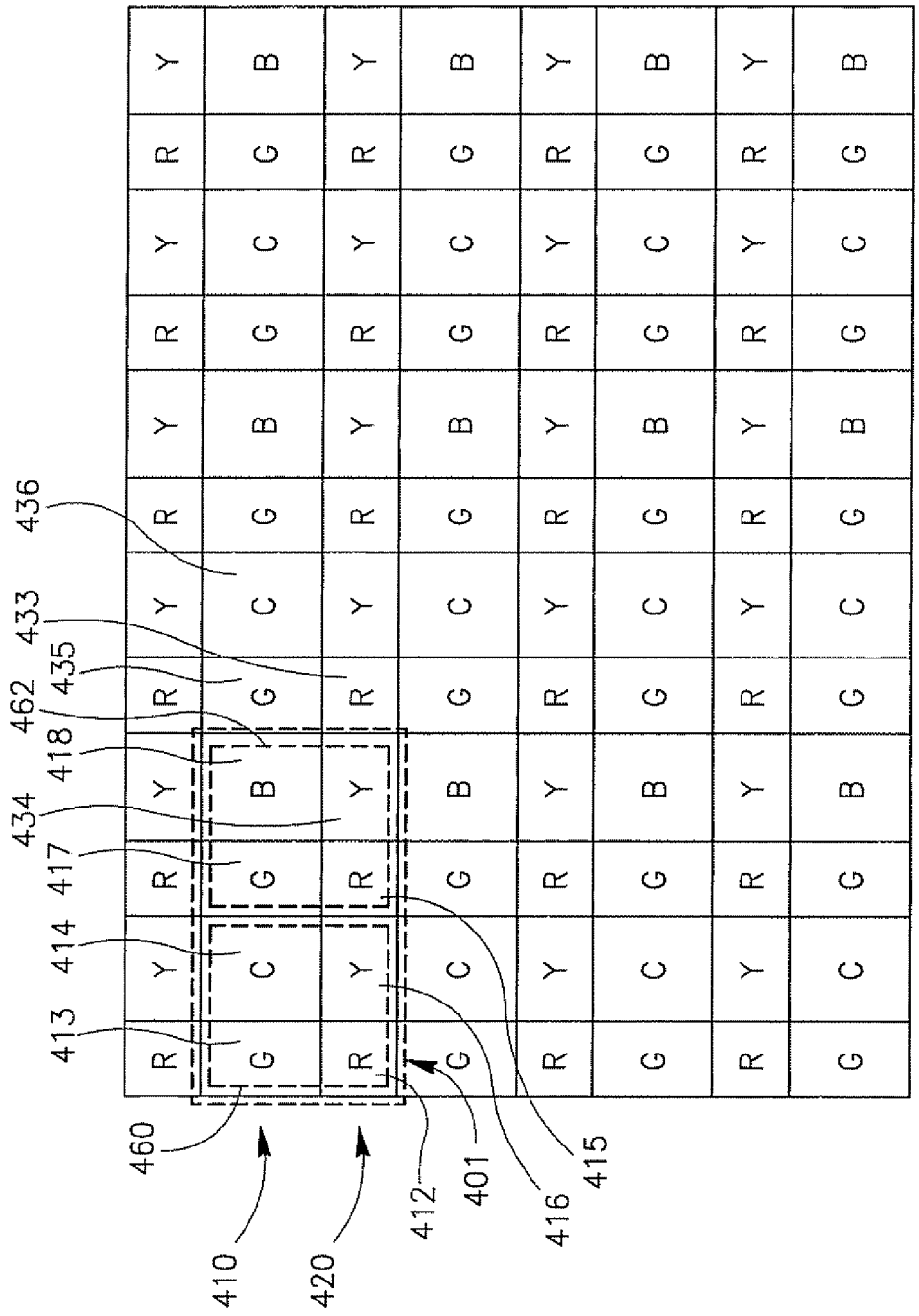
FIG. 4 is a schematic illustration of a sub-pixel configuration including a repeatable pattern of sub-pixel elements, in accordance with yet another exemplary embodiment of the invention.

Reference is made to FIG. 4, which schematically illustrates a configuration 400 of sub-pixel elements in a five-primary display device including a repeatable pattern 401, in accordance with another exemplary embodiment of the invention.

Pattern 401 may include sub-pixel elements corresponding to five primary colors, e.g., red, yellow, green, cyan and blue, arranged in two adjacent rows, e.g., rows 410 and 420.

According to an exemplary embodiment, pattern 401 may include a smaller number of sub-pixel elements corresponding to each of the blue and cyan primary colors in comparison to the number of sub-pixel elements corresponding to each of the red, green and yellow primary colors, as described below.

Row 420 may include four sub-pixel elements 412, 416, 415, and 434 corresponding to the primary colors red, yellow, red and yellow, respectively. Row 410 may include four sub-pixel elements 413, 414, 417, and 418 corresponding to the primary colors green, cyan, green and blue, respectively.

According to this exemplary embodiment, the sub-pixel elements of pattern 401 may be arranged in at least first and second repeatable color sequences, e.g., color sequences 460 and 462. Sequence 460 may include at least one sub-pixel element, e.g., element 414, of a primary color, e.g., cyan, not included in sequence 462. Sequence 462 may include at least one sub-pixel element, e.g., element 418, of a primary color, e.g., blue, not included in sequence 460.

According to this exemplary embodiment, sequences 460 and/or 462 may include sub-pixel elements of a predetermined sub-sequence of some of the primary colors, for example, a red-yellow-green sub-sequence.

According to some exemplary embodiments of the invention, each pixel of the color image may be reproduced by one or more sub-pixel elements of configuration 400. For example, a first pixel of the color image may be reproduced by sub-pixel elements 416, 415, 414, 417 and/or 418; and a second pixel, e.g., adjacent to the first pixel, may be reproduced by sub-pixel elements 434, 418, 433, 435 and/or 436. According to some embodiments of the invention, one or more sub-pixel elements of configuration 400, for example, sub-pixel elements corresponding to the blue and/or cyan primary colors, e.g., sub-pixel elements 418 and/or 414, may be activated based on a value determined by a combination of sub-pixel data corresponding to two or more pixels of the color image. Other sub-pixel elements of configuration 400, for example, sub-pixel elements corresponding to the green, red and/or yellow primary colors, e.g., sub-pixel elements 416, 415, 417, 434, 435 and/or 433, may be activated based on sub-pixel data corresponding to one or more pixels. For example, one or more drivers, e.g. of drivers 120 (FIG. 1), of a sub-pixel element corresponding to one or more of the red, green and/or yellow primary colors, respectively, may be provided a value corresponding to red, green and/or yellow sub-pixel data, respectively, of one or more pixels. This data arrangement may be provided by controller 118 (FIG. 1). A driver, e.g. of drivers 120 (FIG. 1), of a sub-pixel element corresponding to the cyan primary color may be provided with a value determined by a combination, e.g., an arithmetic average, a weighted average and/or any other suitable combination, of cyan sub-pixel data corresponding to two or more pixels. A driver, e.g. of drivers 120 (FIG. 1), of a sub-pixel element corresponding to a blue sub-pixel may be provided with a value determined by a combination, e.g., an arithmetic average a weighted average and/or any other suitable combination, of blue sub-pixel data corresponding to two or more pixels. The two or more pixels may include, for example, two or more neighboring pixels, e.g., two or more vertically, horizontally and/or diagonally adjacent pixels, or any other two or more pixels of the color image. Thus, it will be appreciated by those skilled in the art that since the sub-pixel elements of pattern 401 may be activated to reproduce two pixels, the effective pixel size corresponding to configuration 400 may be equal to half the sum of the areas of the sub-pixel elements of pattern 401. Controller 118 (FIG. 1) may rearrange the sub-pixel data to provide the desired sequences of values to drivers 120.

According to exemplary embodiments of the invention, the size of some of the sub-pixel elements may be different from the size of other sub-pixel elements in order to achieve a desired white balance of the displayed image. For example, the area of each sub-pixel element corresponding to the blue and/or the cyan primaries may be larger than the area of each sub-pixel element corresponding to the red, yellow and/or green primaries.

It will be appreciated by those skilled in the art, that a display system, e.g., system 100 (FIG. 1), implementing configuration 400 for reproducing a color image including l rows of s 5-primary pixels, may include 2*s column driver lines and 2*l row driver lines. Such a display may also include 4*s*l TFTs, e.g., one TFT located on each sub-pixel element. Accordingly, a total blocking area of such a display may be equal to:

$$2*s*L_{column}*t_{column}+2*l*L_{row}*t_{row}+4*l*s*S_{tft} \quad (3)$$

It will be appreciated by those skilled in the art that the over-all cost of driver lines of a 5-primary display implementing configuration 400 may be lower compared to the cost of driver lines of a conventional 3-primary LCD display, e.g., a display including 3*s column driver lines and l row driver lines, because the cost of a column driver line is generally higher than the cost of a row driver line. It will also be appreciated by those skilled in the art, that the over-all cost of a 5-primary display implementing configuration 400 may be lower compared to the over-all cost of some four-primary displays, wherein sub-pixel elements of four or five primaries are used for reproducing each pixel, and of some five-primary displays, wherein sub-pixel elements of five primary colors are used for reproducing each pixel.

It will further be appreciated by those skilled in the art that a display according to the exemplary embodiments described above may have a total blocking area of $2*s*L_{column}*t_{column}+2*l*L_{row}*t_{row}+4*l*s*S_{tft}$, compared to the total blocking area of a conventional 3-primary LCD display, e.g., $3s*L_{column}*t_{column}+1*L_{row}*t_{row}+3*l*s*S_{tft}$.

Furthermore, if $L_{row}=16/9*L_{column}$, s=1280, and l=720, an aperture ratio of approximately 78% may be achieved if configuration 400 is implemented, which is higher than the achievable aperture ratio, e.g., 75%, corresponding to configuration 200, which in turn is higher than the achievable aperture ratio, e.g., 70%, corresponding to a five-primary display wherein sub-pixel elements of five primary colors are used for reproducing each pixel.

It will be appreciated by those skilled in the art that according to other embodiments of the invention, any other suitable pattern of sub-pixel elements, e.g., including any suitable two or more repeatable color sequences, may be implemented by display system 100 (FIG. 1) to form a configuration similar to configuration 400, e.g., as described below.

Figure 5:
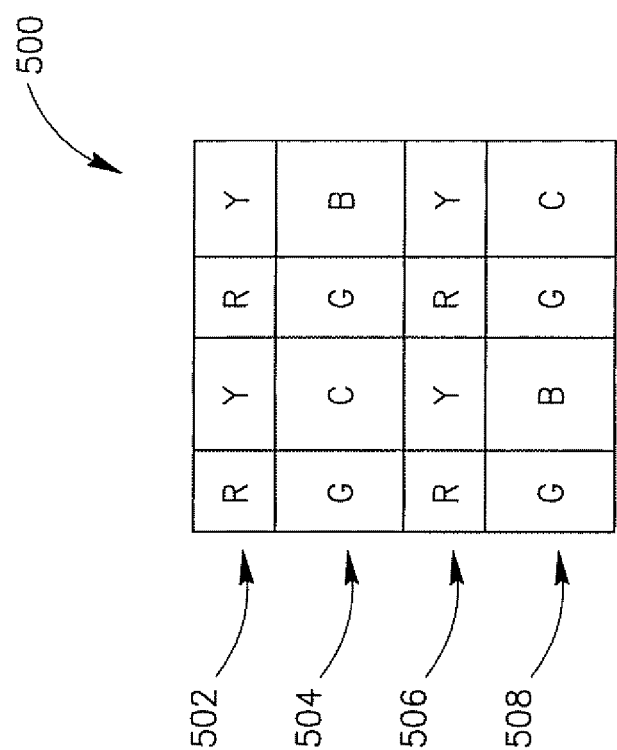
FIG. 5 is a schematic illustration of a pattern of sub-pixel elements, which may be implemented to form a sub-pixel configuration in accordance with additional exemplary embodiments of the invention.

Reference is also made to FIG. 5, which schematically illustrates a 5-primary pattern 500 of sub-pixel elements, which may be implemented to form a sub-pixel configuration according to other exemplary embodiments of the invention.

Pattern 500 may include four rows, e.g., row 502, row 504, row 506, and row 508. Row 502 and row 506 may be identical and may each include a 2-primary sequence, for example, a sequence "red-yellow-red-yellow". Row 504 and row 508 may include a 3-primary sequence, e.g., "green-cyan-green-blue" and a 3-primary sequence, e.g., "green-blue-green-cyan", respectively. It will be appreciated by those skilled in the art that a pattern, e.g., pattern 500, wherein the location of the cyan and blue primary colors is interchanged along the columns, may be implemented to achieve a more uniform color distribution across the display.

Some exemplary embodiments of the invention, e.g., as are described above, may relate to a controller, e.g., controller 118 (FIG. 1) able to provide a driver of a sub-pixel element corresponding to the cyan primary color with a value determined based on a combination of sub-pixel data corresponding to the cyan primary color of two or more pixels, and/or to provide a driver of a sub-pixel element corresponding to the blue primary color with a value determined based on a combination of sub-pixel data corresponding to the blue primary color of two or more pixels. However, other exemplary embodiments of the invention may include a controller, e.g., controller 118 (FIG. 1) able to provide the drivers of one or more sub-pixel elements with a value determined based on any other desired combination of sub-pixel data of one or more pixels, e.g., as described below.

According to some embodiments of the invention, controller 118 (FIG. 1) may be able to provide drivers, e.g., drivers 120 (FIG. 1), corresponding to sub-pixel elements of at least first and second color sequences, e.g., as are described above, based on sub-pixel data corresponding to at least first and second pixels of the color image. Controller 118 (FIG. 1) may be able, for example, to activate at least one sub-pixel element of at least one of the first and second sequences, based on a value determined by a combination of sub-pixel data of at least the first and second pixels, as described below.

According to some exemplary embodiments of the invention, controller 118 (FIG. 1) may be able to activate a sub-pixel element of the first/second sequence based on a value determined by a combination of sub-pixel data of the sub-pixel element to be activated and the primary color not included in the first/second sequence. For example, controller 118 (FIG. 1) may be able to provide the drivers of green sub-pixel elements with a value determined based on a combination of green sub-pixel data and cyan sub-pixel data of a pixel; and/or to provide the drivers of blue sub-pixel elements with a value determined based on a combination of blue sub-pixel data and cyan sub-pixel data of a pixel. Alternatively or additionally controller 118 may be able to provide the drivers of cyan sub-pixel elements with a value determined based on a combination of blue sub-pixel data and cyan sub-pixel data of a pixel; and/or to provide the drivers of red sub-pixel elements with a value determined based on a combination of blue sub-pixel data and red sub-pixel data of a pixel.

In some embodiments, the green, blue and cyan primaries of a display, e.g., display 100 (FIG. 1) may be represented by predetermined green, blue and cyan primary color vectors in the XYZ color space, denoted $\vec{P}_G$, $\vec{P}_B$, and $\vec{P}_C$, respectively.

According to some exemplary embodiments of the invention, a combination, e.g., a linear combination, of the green and blue primary color vectors, may be implemented to produce a color approximately equivalent or comparable to the cyan primary color. A desired linear combination may be determined, for example, using the following equation:

$$\vec{P}_C \approx \beta \vec{P}_B + \gamma \vec{P}_G \quad (4)$$

wherein β and γ denote parameters relating to the linear contributions of the blue and green primary colors, respectively. It will be appreciated that the linear combination according to Equation 4 may be used to reproduce a color equivalent to the cyan primary color, e.g., if the chromaticity value of the cyan primary color is located on a line connecting the chromaticity values of the green and blue primary colors, or comparable to the cyan primary color, e.g., if the chromaticity value of the cyan primary color is located off but relatively proximal to the line connecting the chromaticity values of the green and blue primary colors.

As described above, some pixels of display 100 may be reproduced by a plurality of sub-pixel elements not including a blue sub-pixel element ("non-blue sub-pixel elements"), and/or some pixels may be reproduced by a plurality of sub-pixel elements not including a cyan sub-pixel ("non-cyan sub-pixel elements"). According to exemplary embodiments of the invention, controller 118 (FIG. 1) may be able to provide the drivers of one or more non-cyan sub-pixel elements with a value determined based on cyan sub-pixel data. For example, controller 118 (FIG. 1) may provide the drivers of blue and/or green sub-pixel elements for reproducing a pixel with signals B' and G', respectively, e.g., according to the following equation set:

$$B'=B+C\cdot\beta$$

$$G'=G+C\cdot\gamma \quad (5)$$

wherein B, G, and C denote the blue, green and cyan image components of the pixel to be reproduced. According to some exemplary embodiments of the invention, the values of one or both of B' and/or G' may be "clipped", i.e., set to a maximal producible value of the blue and green primary colors, respectively, e.g., if the values of B' and/or G' calculated according to Equation 5 exceed the maximal producible value of the blue and/or green primary colors, respectively.

It will be appreciated by those skilled in the art, that activating blue and/or green sub-pixel elements based on cyan sub-pixel data may improve the perceived spatial resolution of the cyan primary color and/or reduce a perceived luminance variation between a pixel reproduced by non-blue sub-pixel elements and a pixel reproduced by non-cyan sub-pixel elements.

According to some exemplary embodiments of the invention, it may be desired to reduce a color shift, e.g., a cyan color shift, which may result, for example, from activating one or more non-cyan sub-pixel elements based on a value determined by cyan sub-pixel data. Such a color shift may be reduced, according to some exemplary embodiments of the invention, by activating a blue sub-pixel element, e.g., of a first color sequence, based on a corrected value determined by a combination, e.g., a sum, of blue sub-pixel data of a first pixel and a blue correction component, ΔB; activating a green sub-pixel element, e.g., of the first color sequence, based on a corrected value determined by a combination, e.g., a sum, of green sub-pixel data of the first pixel and a green correction component, ΔG; and activating a cyan sub-pixel element, for example, of a second color sequence, e.g., adjacent to the first color sequence, based on a corrected value determined by a combination of, e.g., a difference between, cyan sub-pixel data of a second pixel and a cyan correction component, ΔC, as described below.

According to some exemplary embodiments of the invention, the correction components ΔC, ΔB, and ΔG may be determined such that the luminance of the cyan primary color reproduced by the cyan sub-pixel element is substantially equal to the sum of the luminance of the blue primary color reproduced by the blue sub-pixel element and the luminance of the green primary color resulting from the green correction component ΔG. Additionally, it may be desired that the amount of the cyan color resulting from the cyan correction component ΔC, will be substantially equal to the amount of a cyan-equivalent color reproduced by the green and blue sub-pixel elements, e.g., the sum of the amount of blue color resulting from the blue correction component, ΔB, and the amount of the green color resulting from the green correction component, ΔG. For example, the correction components may be determined using the following equations:

$$(C-\Delta C)\cdot Y_C=(B+\Delta B)\cdot Y_B+\Delta G\cdot Y_G \quad (6)$$

$$\Delta C\cdot \vec{P}_C=\Delta B\cdot \vec{P}_B+\Delta G\cdot \vec{P}_G \quad (7)$$

wherein $Y_C$, $Y_B$, and $Y_G$ denote the luminance of the cyan, blue and green primary colors.

Substituting Equation 4 in Equation 7 and re-arranging terms may yield the following equations:

$$\Delta B=\beta\Delta C \quad (8)$$

$$\Delta G=\gamma\Delta C \quad (9)$$

Substituting Equations 8 and 9 in Equation 6 and rearranging terms may yield the following equation:

$$\Delta C = \frac{C\cdot Y_C - B\cdot Y_B}{Y_C + \beta\cdot Y_B + \gamma\cdot Y_G} \quad (10)$$

According to exemplary embodiments of the invention, controller 118 (FIG. 1) may determine a value for the cyan correction component ΔC, e.g., by substituting in Equation 10 the primary color luminance values $Y_C$, $Y_B$, and $Y_G$, predefined parameters β and γ, and the cyan and a value corresponding to the blue sub-pixel data of the first pixel. Controller 118 may additionally determine a value for the blue correction component ΔB and/or a value for the green correction component ΔG, e.g., using Equations 8 and 9. Controller 118 may provide the blue, green and cyan sub-pixel elements with corrected values, e.g., based on the correction components ΔB, ΔG, and ΔC, e.g., as described above.

According to some exemplary embodiments of the invention, the corrected value provided to the blue sub-pixel and/or the corrected value provided to the green sub-pixel may be clipped, e.g., if the corrected value provided to the blue sub-pixel element and/or the corrected value provided to the green sub-pixel element exceed the maximal producible value of the blue and/or green primary colors, respectively.

Some exemplary embodiments of the invention, e.g., as are described above, relate to activating green and/or blue sub-pixel elements based on cyan sub-pixel data; and/or activating green, blue and/or cyan sub-pixel elements based on corrected values. However, other embodiments of the invention may analogously be implemented for activating one or more other sub-pixel elements, e.g., a cyan sub-pixel element or cyan and red sub-pixel elements, based on other sub-pixel data, e.g., blue sub-pixel data; and/or activating other sub-pixel elements, e.g., cyan red and blue sub-pixel elements, based on corrected values. For example, in other embodiments, one or more sub-pixel elements may be activated based on any suitable combination of sub-pixel data of one or more pixels, e.g., a combination corresponding to a spatial function of one or more pixels.

Various embodiments of the invention may also use different alternating colors than cyan-blue, as described above. For example, in one embodiment of the invention, depicted in FIG. 6A, the display may comprise alternating pixels 610 and 620. A first pixel 610 may include sub-pixel elements red, green, blue and yellow. A second pixel 620, adjacent to the first pixel 610, may include sub-pixel elements cyan, red, green and blue. It will be recognized that pixels such as pixels 610 and 620 may repeat alternatingly to cover substantially the entire display.

Figure 6A:
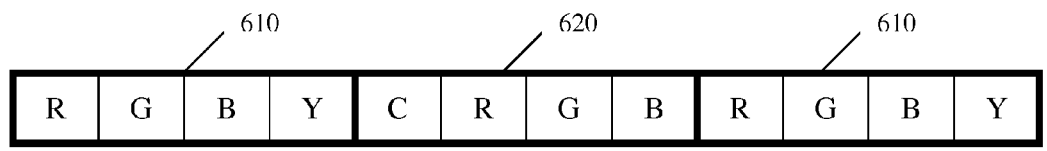
FIGS. 6A, 6B, and 6C are schematic illustrations of a portion of a five-color display embodiment of the present invention having three colors repeating and two colors alternating, where the pixels are each arranged on a single horizontal row.

According to embodiments of the invention having alternating cyan-yellow in adjacent pixels, depicted in FIG. 6A, in a pixel containing the yellow sub-pixel, cyan may be produced by modifying the intensity values of the green and blue sub-pixels to include a cyan component, as discussed, for example at Equation (5) and Equations (8) to (10), above or any of the other above equations Likewise, in a pixel containing the cyan sub-pixel, yellow may be produced by modifying the intensity values of the green and red sub-pixels to include a yellow component, using the equations above for yellow using red and green sub-pixels. Thus, for example, in the arrangement of FIG. 6A, the blue sub-pixel will carry blue information and a portion of cyan information; the red sub-pixel will carry red information and a portion of yellow information; and the green sub-pixel will carry green information and a portion of both cyan and yellow information. Embodiments of the present invention may also enable enhancement of white or luminance information by modifying two sets of sub-pixels independently, e.g., modifying RGB and YC sets of sub-pixels to enhance the luminance resolution of the resulting image.

Displays according to the present invention may be operated in at least two modes. In a first mode, the number of data pixels per line in the data stream may be identical to the number of display pixels. In such first mode, each data pixel may be converted into sub-pixel values for within each display pixel. This conversion may be performed by translating the three-dimensional input for each of the display pixels to the sub-pixel values representing the colors within each corresponding pixel. For example, using the embodiment of FIG. 6A, RGB input data may be converted into RGBY display data for a pixel containing yellow, and into RGBC display data for a pixel containing cyan. Alternatively, the three-dimensional input may be converted to color values for all n colors for each pixel, and based on the sub-pixels included in each particular pixel, further processing may be applied to determine the intensity values for each of the sub-pixels in the pixel, as discussed in the above equations, e.g., Equations (5) and (8) to (10), and similar equations for yellow using red and green sub-pixels.

In a second mode of operation, for example, when the display is a monitor provided by graphic data from a computer, data may be provided at a higher resolution than that of the display. For example, the number of data pixels per line may be greater than the number of display pixels in that line. In another example, the data may be given in vector format, e.g., infinite resolution, and then be rendered directly to the display format. Such data may be, for example, text or graphic data in many computer applications. Accordingly, the high resolution input data stream may be sampled more than once per display pixel, thus enhancing the resolution. Thus, for each display pixel, more than one input data point may be obtained.

For example, in the case of black-and-white data, or gray scale data, the data may be sampled three times per two sub-pixels of FIG. 6A: at the center of the RGB sub-pixels, e.g., at the G sub-pixels, of the first and second pixels; and at the center of the YC sub-pixels, e.g., at the junction of the Y sub-pixel of the first pixel and the C sub-pixel of the second pixel. The black-and-white data may then be reconstructed by the two RGB triads in the first and second pixels and the CY sub-pixel combination. For a general color input, a separation to a luminance and color channels may be performed, the luminance channel processed, and sampled at the higher spatial frequency, while the chromatic channels processed at the display resolution.

Figure 6B:
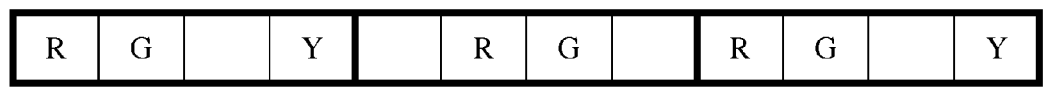
Figure 6C:

In another example using FIG. 6A, yellow information may be sampled and displayed at three locations for each two adjacent pixels, e.g., at each yellow sub-pixel and at each red and green pair of sub-pixels, as depicted in FIG. 6B. Similarly, cyan information may be sampled and displayed at three locations for each two adjacent pixels, e.g., at each cyan sub-pixel and at each blue and green pair of sub-pixels, as depicted in FIG. 6C.

It will be recognized that the embodiment of the invention depicted in FIG. 6A represents an n-color display, n representing the total number of colors represented by the sub-pixels, where n=5. It will be recognized that in various embodiments of the invention, n may be any number greater than three. Each pixel comprises a number m of sub-pixels, where not all of n pixels are represented in each pixel. In the embodiment depicted in FIG. 6A, therefore, m=4.

It will be recognized that the arrangement of sub-pixels depicted in the embodiment of FIG. 6A may be modified within the spirit of the invention. In one embodiment, n=5 and m=3, with one color repeating, for example, red, and two colors alternating, for example, blue-yellow in one pixel and cyan-green in the next pixel. In another embodiment, n=6 and m=4, with two colors repeating, for example, red and green, and two colors alternating, for example, blue-yellow in one pixel and cyan-magenta in the next pixel. In yet another embodiment, n=6 and m=4, with one sub-pixel alternating among cyan, yellow and magenta in each of three adjoining pixels. In yet another embodiment, n=6 and m=5, with red, green and blue repeating, and two sub-pixels in each pixel alternating among cyan and yellow, yellow and magenta, and cyan and magenta.

It will be further recognized that the particular ordering of the sub-pixels within each pixel may provide certain advantages. For example, in the embodiment depicted in FIG. 6A, it will be recognized that the enhancement of white, yellow and cyan may be distributed evenly by the placement of the sub-pixels.

Thus, for example, in the embodiment depicted at FIG. 6A, the yellow information may be carried by red and green sub-pixels, and by the yellow sub-pixels. Thus, it will be noted that the red and green sub-pixels are adjacent each other in both pixels 610 and 620. Moreover, the yellow information units, e.g., red-green sub-pixel pairs and the yellow sub-pixels, are equidistant from each other on any side. In order to demonstrate this feature, FIG. 6B depicts the sub-pixels in FIG. 6A that carry yellow information, omitting sub-pixels that carry no yellow information. It may be observed that red-green sub-pixel pairs and yellow sub-pixels are separated by one sub-pixel, thereby producing a uniform distribution of yellow information.

Similarly, for example, in the embodiment depicted at FIG. 6A, the cyan information may be carried by blue and green sub-pixels, and by the cyan sub-pixels. Thus, it will be noted that the blue and green sub-pixels are adjacent each other in both pixels 610 and 620. Moreover, the yellow information units, e.g., red-green sub-pixel pairs and the yellow sub-pixels, are equidistant from each other on any side. In order to demonstrate this feature, FIG. 6C depicts the sub-pixels in FIG. 6A that carry cyan information, omitting sub-pixels that carry no cyan information. It may be observed that blue-green sub-pixel pairs and cyan sub-pixels are separated by one sub-pixel, thereby producing a uniform distribution of cyan information.

Figure 6D:
FIG. 6D is a schematic illustration of a portion of another five-color display embodiment of the present invention having three colors repeating and two colors alternating, where the pixels are each arranged on a single horizontal row.

Another embodiment of the invention is depicted at FIG. 6D. It will be noted that in this embodiment, as with FIG. 6A, RGB sub-pixels are located in each pixel. However, the yellow and cyan are not adjacent to each other at the border of the adjacent pixels, but rather, the yellow and cyan sub-pixels are separated by a set of RGB subpixels. Accordingly, as with FIG. 6A, RGB colors may be evenly distributed, but the yellow and cyan may have different distribution than in FIG. 6A.

In this configuration, the luminance (white) signal may be reproduced with higher resolution using the RG, Y, and C units, while the B sub-pixels may be used to compensate for color deviation from white.

Figure 7A:
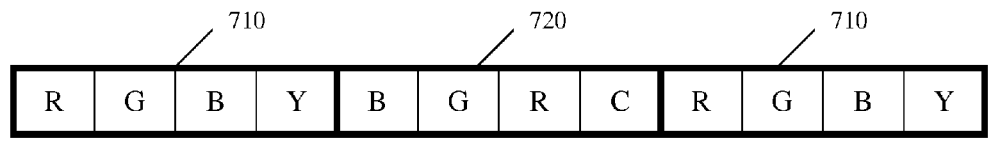
FIGS. 7A, 7B, 7C and 7D are schematic illustrations of a portion of another five-color display embodiment of the present invention having three colors repeating and two colors alternating, where the pixels are each arranged on a single horizontal row.

Another embodiment of the invention is depicted in FIG. 7A. The configuration depicted in FIG. 7A may enable even distribution of high intensity, e.g., green, yellow and cyan subpixels. It will be noted that in the arrangement of FIG. 7A, every alternate location contains either a green, yellow or cyan subpixel.

Figure 7B:
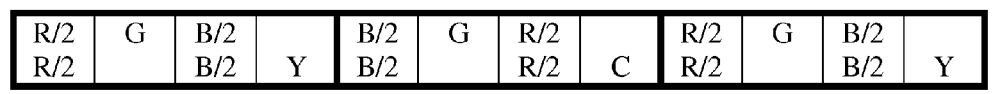

The configuration of the invention depicted in FIG. 7A may also enable increased white, yellow and cyan resolution. In this embodiment of the invention, white resolution may be enhanced by modifying sets of three adjacent sub-pixels. FIG. 7B depicts the embodiment of FIG. 7A divided into overlapping sets of three adjacent sub-pixels. In the illustration of FIG. 7B, each of the red and blue sub-pixels are "divided" into two halves, with each of the halves belonging to a different set of sub-pixels, each set producing white. Thus, for example, the first three sub-pixels of pixel 710 include R/2, G and B/2. These sub-pixels therefore, may be used to produce a white enhancement, albeit a slightly green white, insofar as the green has twice as much representation as the red and blue. The next overlapping set of three sub-pixels is B/2, Y, and B/2, which yields white. The next set, B/2, G, and R/2 would again produce a greenish white. Finally, the set of sub-pixels comprising R/2, C, and R/2 would yield a slightly reddish white. For purposes of enhanced resolution, these slight color variations, e.g., greenish, reddish, are not important.

Figure 7C:
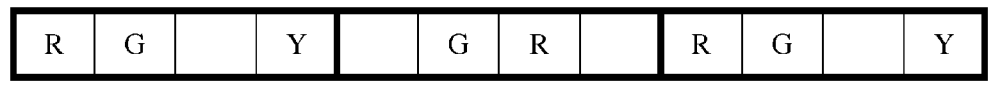
Figure 7D:

In addition to the above white enhancement, the embodiment of FIG. 7A may be used to enhance yellow and cyan resolution. Reference is made to the illustration of FIG. 7C, which depicts sub-pixels in pixels 710 and 720 having yellow information. For yellow resolution, it will be noted that red and green sub-pixel pairs may be kept adjacent to each other, and are equidistant from the yellow sub-pixels and from each other. Reference is made to the illustration of FIG. 7D, which depicts sub-pixels in pixels 710 and 720 having cyan information. For cyan resolution, it will be noted that blue and green sub-pixel pairs may be kept adjacent to each other, and are equidistant from the cyan sub-pixels and from each other.

Some embodiments of the invention may form pixels by using sub-pixels in more than one row. Reference is made to FIGS. 8A, 8B and 8C, which depict double-row pixel embodiments of the invention in which sub-pixels are arranged in a square matrix to form a pixel. In all of FIGS. 8A, 8B and 8C, pixels alternate horizontally between RGBY and RGBC. In FIG. 8A, the red, green and blue sub-pixels are in the same location in all pixels, and the fourth place alternates between yellow and cyan. FIG. 8B is similar to FIG. 8A in most regards, however, it will be recognized that the adjacency of the red and green sub-pixels may produce greater effectiveness in yellow enhancement, and the adjacency of blue and green sub-pixels may produce greater effectiveness in cyan enhancement.

In FIG. 8C, the locations of red, green and blue sub-pixels change between the RGBY and RGBC sub-pixels. It will be recognized that in the embodiment of FIG. 8C, there is a vertical shift between horizontally adjacent pixels, thereby maintaining a relatively uniform distance between sub-pixels of the same color in adjacent pixels for evenness of display. Thus, the distance between any two red sub-pixels in horizontally adjacent pixels is the distance of two sub-pixels horizontally and one sub-pixel vertically. Other possible configurations are consistent with the present invention, provided that, in each pixel, there are red, blue, green and a fourth sub-pixel, where the fourth sub-pixel alternates between cyan and yellow.

The above aspects of embodiments of the invention demonstrated the alternating arrangement of pixels within each row in the case of single-row pixels, or pair of rows in the case of double-row pixels. In some embodiments of the invention, the arrangement of the rows or pixels with respect to each other may further provide certain advantages.

With respect to single-row pixels, in some embodiments of the invention, the rows may be arranged in stripe fashion, such that each sub-pixel is vertically adjacent to sub-pixels of the same color. This may provide clean vertical lines and ease of manufacturing.

Reference is made to FIG. 9A, 9B and 9C, which depict the single-row pixel embodiment of the invention depicted in FIG. 6A, in which sub-pixels in each row may be shifted versions of the arrangements in the rows above them. Each row may be shifted by the same number of sub-pixels. Thus, in FIG. 9A, each row is shifted by one sub-pixel. In FIG. 9B, each row is shifted by two sub-pixels. In FIG. 9C, each row is shifted by three sub-pixels. One advantage of shifted or staggered arrangements is uniformity.

Reference is made to FIG. 10A and 10B, which depict double-row pixel embodiments of the invention depicted in FIG. 8A, in which sub-pixels in each pair of rows may be shifted versions of the arrangements in the pair of rows above them. Each pair of rows may be shifted by the same number of sub-pixels. Thus, in FIG. 10A, each pair of rows is shifted by one sub-pixel. In FIG. 10B, each pair of rows is shifted by two sub-pixels. A shift of any number of sub-pixels in either horizontal direction may be possible, for example, one sub-pixel, two sub-pixels, three sub-pixels, etc.

Reference is made to FIGS. 11A and 11B, which depict the double-row pixel arrangement of FIG. 8B. It will be recognized that in the embodiment of FIG. 11A, there is no shift between pairs of rows, because of the effective vertical shift between horizontally adjacent pixels. Thus, for example, a uniform distance is maintained between sub-pixels of the same color. Other arrangements consistent with embodiments of the present invention are possible.

It will be noted that in some embodiments of the invention, such shifted or staggered display sub-pixel arrangements may allow certain single color sub-pixels to be placed more closely in the horizontal direction, thus improving resolution.

The above embodiments of the invention included non-white sub-pixels, e.g., red, blue, green, cyan and yellow sub-pixels. In some embodiments of the invention, a display may include both white and non-white sub-pixels. In some embodiments of the invention, each pixel may have four sub-pixels, where each pixel includes red, green and blue sub-pixels, and the fourth color in each pixel alternates between yellow and white. This embodiment of the invention may produce yellow enhancement while providing enhanced brightness. It will be recognized that this embodiment of the invention may be used, for example, in conjunction with any of the above alternating cyan-yellow arrangements by replacing cyan sub-pixels with white sub-pixels.

Although some of the exemplary devices, systems and/or methods described above are described in the context of devices for reproducing five primary colors, it will be appreciated by those skilled in the art, that similar devices, systems and/or methods may be implemented, with appropriate changes, in conjunction with devices for reproducing more or less than five primary colors.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A color display device for displaying a more-than-three primary color image, the device comprising:
   an array of sub-pixel elements of at least four different primary colors arranged in at least first and second repeatable color sequences of sub-pixel elements of at least three primary colors,
   wherein said first color sequence includes at least one sub-pixel element of a primary color not included in said second sequence,
   wherein the sub-pixel elements of said array are arranged in a repeatable pattern including sub-pixel elements of each of said at least four primary colors, said pattern including less sub-pixel elements of a first primary color than sub-pixel elements of a second primary color,
   wherein said pattern comprises eight sub-pixel elements, and
   wherein said pattern comprises two adjacent rows of four sub-pixel elements.

2. The display device of claim 1, comprising a controller able to selectively activate at least some sub-pixel elements of said array to produce one or more attenuation patterns based on sub-pixel data representing pixels of said color image.

3. The display device of claim 2, wherein said controller is able to activate sub-pixel elements of said first and second color sequences based on sub-pixel data corresponding to at least first and second pixels of said color image.

4. The display device of claim 3, wherein said controller is able to activate at least one sub-pixel element of at least one of said first and second sequences, based on a value determined by a combination of sub-pixel data of said at least first and second pixels.

5. The display device of claim 4, wherein said at least one sub-pixel element to be activated comprises the sub-pixel element of the primary color not included in said second sequence, and wherein said sub-pixel data comprises sub-pixel data of said at least first and second pixels corresponding to the primary color not included in said second sequence.

6. The display device of claim 3, wherein said controller is able to activate a sub-pixel element of said second sequence based on a value determined by a combination of sub-pixel data of the sub-pixel element to be activated and the primary color not included in said second sequence.

7. The display device of claim 6, wherein said controller is able to activate a green sub-pixel element of said second sequence based on a value determined by a combination of green and cyan sub-pixel data of said second pixel.

8. The display device of claim 6, wherein said controller is able to activate a blue sub-pixel element of said second sequence based on a value determined by a combination of blue and cyan sub-pixel data of said second pixel.

9. The display device of claim 6, wherein said controller is able to activate a cyan sub-pixel element of said second sequence based on a value determined by a combination of blue and cyan sub-pixel data of said second pixel.

10. The display device of claim 3, wherein said controller is able to:
    activate a first sub-pixel element of said second sequence based on a value determined by a combination of sub-pixel data of said second pixel corresponding to the primary color of said first sub-pixel element, and a first correction component;
    activate a second sub-pixel element of said second sequence based on a value determined by a combination of sub-pixel data of said second pixel corresponding to the primary color of said second sub-pixel element, and a second correction component; and
    activate the sub-pixel element of the primary color not included in said second sequence based on a value determined by a combination of sub-pixel data of said first pixel corresponding to the primary color not included in said second sequence, and a third correction component.

11. The display device of claim 10, wherein said controller is able to determine at least one of said first, second and third correction components based on a relation between the luminance reproduced by said first sub-pixel element, said second sub-pixel element and the sub-pixel element of the primary color not included in said second sequence.

12. The display device of claim 11, wherein said controller is able to determine at least one of said first, second and third correction components such that a value corresponding to the luminance reproduced by the sub-pixel element of the primary color not included in said second sequence is substantially equal to the sum of the luminance reproduced by said first and second sub-pixel elements.

13. The display of claim 10, wherein said first and second sub-pixel elements comprise green and blue sub-pixel elements, and wherein the sub-pixel element of the primary color not included in said second sequence comprises a cyan sub-pixel element.

14. The display device of claim 1, wherein said second color sequence includes at least one sub-pixel element of a primary color not included in said first sequence.

15. The display device of claim 1, wherein said at least four different primary colors comprise at least five primary colors.

16. The display device of claim 15, wherein said at least five primary colors comprise red, yellow, green, cyan and blue.

17. The display device of claim 1, wherein said at least four primary colors comprise at least five primary colors, wherein said repeatable pattern includes sub-pixel elements of blue, cyan, green, red and yellow primary colors, and wherein the number of blue and cyan sub-pixel elements in said pattern is smaller than the number of green, red and yellow sub-pixel elements in said pattern.

18. The display device of claim 1, wherein said pattern comprises a row of sub-pixel elements arranged in the order green-cyan-green-blue, and an adjacent row of sub-pixel elements arranged in the order red-yellow-red-yellow.

19. The display device of claim 1, wherein said pattern comprises sixteen sub-pixel elements.

20. The display device of claim 19, wherein said sixteen sub-pixel elements are arranged in first and second adjacent rows, each row including eight of said sub-pixel elements.

21. The display device of claim 20, wherein sub-pixel elements of said first row are arranged in the order yellow-green-red-cyan-yellow-green-red-blue, and sub-pixel elements of said second row are arranged in the order yellow-green-red-blue-yellow-green-red-cyan.

22. The display device of claim 20, wherein sub-pixel elements of said first row are arranged in the order red-yellow-green-cyan-red-yellow-green-blue, and sub-pixel elements of said second row are arranged in the order red-yellow-green-blue-red-yellow-green-cyan.

23. The display device of claim 19, wherein said sixteen sub-pixel elements are arranged in four adjacent rows, each including four of said sub-pixel elements.

24. The display device of claim 23, wherein sub-pixel elements of each of the first and third rows of said pattern are arranged in the order red-yellow-red-yellow, wherein sub-pixel elements of the second row of said pattern are arranged in the order green-cyan-green-blue, and wherein sub-pixel elements of the fourth row of said pattern are arranged in the order green-blue-green-cyan.

\* \* \* \* \*